United States Patent
Alford et al.

(10) Patent No.: US 7,405,693 B2
(45) Date of Patent: Jul. 29, 2008

(54) SYSTEM AND METHOD FOR SYNTHESIZING DATA IN A RADAR SYSTEM

(75) Inventors: James Larry Alford, Enterprise, AL (US); Michael B. Knight, Enterprise, AL (US)

(73) Assignee: Enterprise Electronics Corporation, Enterprise, AL (US)

( * ) Notice: Subject to any disclaimer, the term of this patent is extended or adjusted under 35 U.S.C. 154(b) by 48 days.

(21) Appl. No.: 11/612,730

(22) Filed: Dec. 19, 2006

(65) Prior Publication Data

US 2008/0143588 A1   Jun. 19, 2008

(51) Int. Cl.
*G01S 13/95* (2006.01)
(52) U.S. Cl. .................... 342/26 R; 342/26 D; 342/195
(58) Field of Classification Search ............... 342/26 R, 342/26 A, 26 B, 26 C, 26 D, 189, 195
See application file for complete search history.

(56) References Cited

U.S. PATENT DOCUMENTS

| | | | | |
|---|---|---|---|---|
| 5,907,568 A | * | 5/1999 | Reitan, Jr. ................. | 342/26 B |
| 6,081,221 A | * | 6/2000 | Zrnic et al. ................ | 342/26 R |
| 6,307,500 B1 | * | 10/2001 | Cornman et al. .......... | 342/26 R |
| 6,859,163 B2 | * | 2/2005 | Alford et al. .............. | 342/26 D |
| 6,861,977 B2 | * | 3/2005 | Erkocevic-Pribic ......... | 342/195 |
| 7,109,912 B1 | * | 9/2006 | Paramore et al. .......... | 342/26 B |
| 2003/0071750 A1 | * | 4/2003 | Benitz ......................... | 342/25 |
| 2007/0222661 A1 | * | 9/2007 | Stagliano et al. .......... | 342/26 R |

\* cited by examiner

*Primary Examiner*—John B Sotomayor
(74) *Attorney, Agent, or Firm*—Russell Carter Gache; Maynard, Cooper & Gale, PC

(57) ABSTRACT

A system for synthesizing data received from a weather radar system includes a digital signal processor, a data synthesizer, a convolution filter, and data storage. The digital signal processor digitizes reflectivity data from a radar antenna. The data synthesizer generates an M×N matrix for a digitized reflectivity data point and populates each element in the M×N matrix with the value of the digitized reflectivity data point. The convolution filter calculates a filtered value for each element in the M×N matrix. The data storage stores the M×N matrix for display.

34 Claims, 7 Drawing Sheets

SYSTEM AND METHOD FOR SYNTHESIZING DATA IN A RADAR SYSTEM

FIELD OF THE INVENTION

The present invention relates generally to the processing of data from weather radar systems. More specifically, the present invention relates to hardware and software to improve data resolution in weather radar systems.

BACKGROUND OF THE INVENTION

The majority of weather radar systems utilize a signal processor to digitize an analog weather radar signal and then average a number of samples together to produce one ray of processed precipitation reflectivity. As processing evolved to digital signal processors the technique remained primarily the same. Digitizing sample clocks became variable to a degree. By adjusting the sample clocks, the range resolution of the processing system became more customizable. Pulse sample sizes also became more flexible. Adjustment of the pulse sample sizes made angular resolution variable.

These techniques allowed for sample volume coverage with controllable sample deviation. The limitations of this style of processing became noticeable as display systems became more capable of enlarging the smaller weather areas which demonstrated the higher digitized equality of the radar data as it was represented by a four-sided polygon. In order to better represent the weather data when magnified, a number of data algorithm techniques, and raster display algorithm techniques have been employed.

SUMMARY OF THE INVENTION

A system for synthesizing data received from a weather radar system includes a digital signal processor, a data synthesizer, a convolution filter, and data storage. The digital signal processor digitizes reflectivity data from a radar antenna. The data synthesizer generates an M×N matrix for a digitized reflectivity data point and populates each element in the M×N matrix with the value of the digitized reflectivity data point. The convolution filter calculates a filtered value for each element in the M×N matrix. The data storage stores the M×N matrix for display.

DESCRIPTION OF THE PREFERRED EMBODIMENTS

Figure 1:
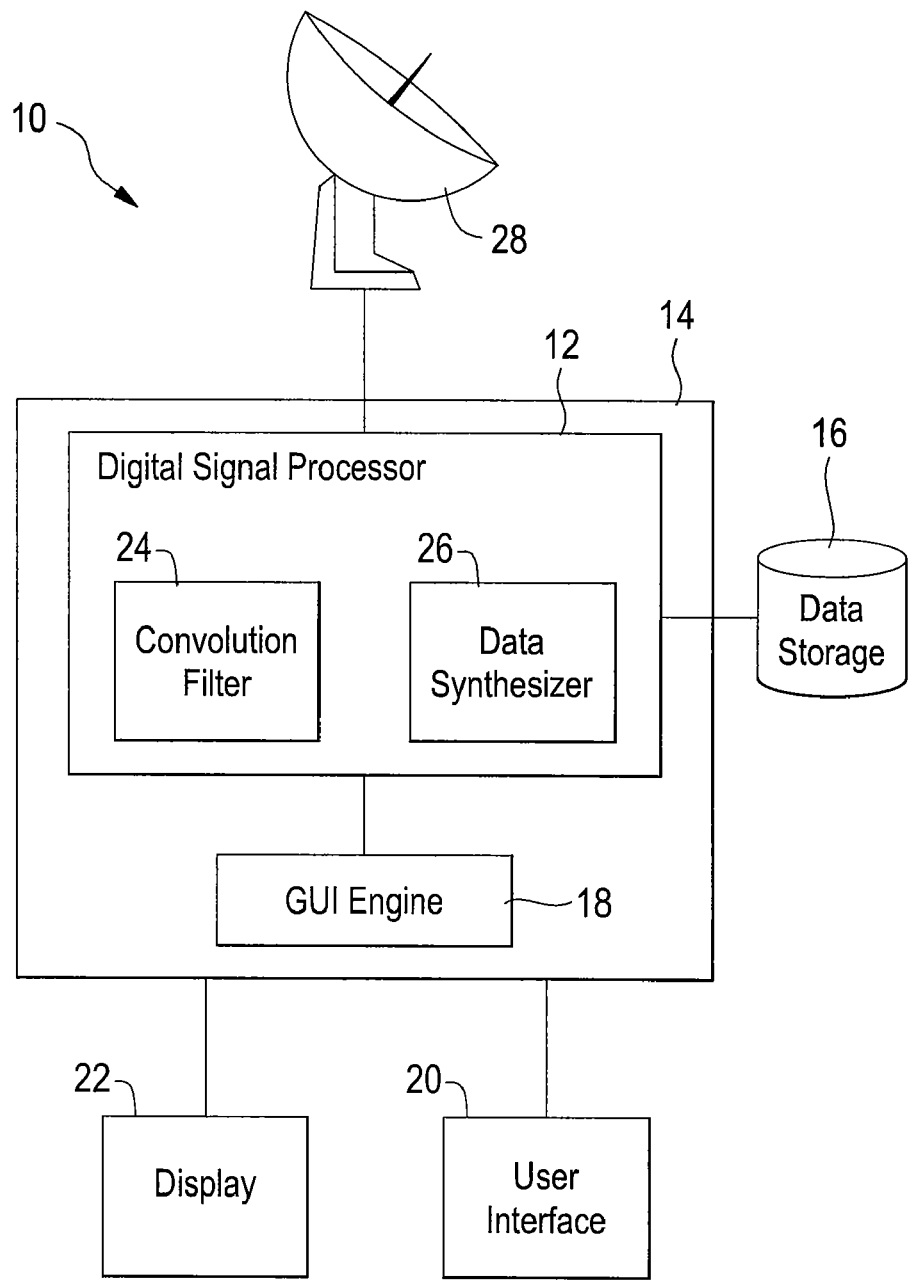
FIG. 1 is a system diagram of a radar system.

Turning now to the drawing figures, FIG. 1 is a system diagram of a radar system 10. The radar system 10 includes a digital signal processor 12, a control module 14, data storage 16 and a GUI engine 18. The radar system 10 further includes a user interface 20, a display 22 and a radar antenna 28. A user inputs parameters through the user interface 20 to the control module 14 in order to process the information from the radar antenna 28 for display on the display 22. The radar antenna 28 receives a transmitted electromagnetic signal and concentrates that signal for processing. The electromagnetic signal has an amplitude and a phase which together denote characteristics of the atmosphere at a range, d and at an angular position, r. The orientation of the radar antenna 28 at the time of collection of the transmitted electromagnetic signal determines the location of the atmospheric conditions denoted by the phase and amplitude of the electromagnetic signal. As the orientation of the radar antenna 28 changes, the electromagnetic signal received by the antenna denotes the atmospheric conditions of locations surrounding the antenna. The range of the detected atmospheric conditions is determined by the time it takes for the radar to receive the electromagnetic signal from the time that signal was transmitted from the transmitter. Thus, the exact location of the atmospheric condition may be mapped from the radar antenna 28 location at a distance determined by the time for signal reception and a direction determined by the rotated position of the radar antenna 28.

Generally, the radar antenna 28 is rotated on a pedestal. The antenna 28, generally, includes both the transmitter and the receiver of the signal. Such a configuration allows the antenna 28 to transmit and receive the electromagnetic signal. As the antenna 28 rotates, the antenna 28 transmits and receives the signal in a 360° arc around the antenna position. As the antenna 28 receives the transmitted signal the antenna 28 transmits the signal to the digital signal processor 12 for processing. The digital signal processor 12 also records the direction of the antenna 28 and the time from transmission to reception of the signal so that it may map the received signal to the two-dimensional space the distance, d from the antenna at the direction r from the antenna 28. The resolution of the antenna signal is determined by the rotation rate of the antenna 28 for the direction r and is determined by the pulse width of the transmitted signal for the distance d. Longer pulse widths and faster rotations produce less resolution in both directions. Because the resolution in the rotated direction r is an angular resolution, the further the distance d from the antenna the less resolution of the received signal relative to the geographic region the data represents.

The digital signal processor 12 is a special purpose central processing unit that provides fast instruction sequences, such as shift and add, and multiply and add which are commonly used in math intensive signal processing applications. Generally, the digital signal processor 12 may be considered an embedded controller dedicated to the single task of digitizing the received analog signal from the antenna 28. The benefit of transforming the analog signal into a digital signal allows the individual data points to be reduced to numbers, and thus analyzed in relation to one another. Moreover, the digitized signals may be filtered to provided a more complete analysis of the local weather conditions. Digital signal processor 12 may perform the operations in real time. Moreover, filtering and data synthesis may also be performed in real time.

The digital signal processor 12 includes a convolution filter 24 and a data synthesizer 26. The convolution filter 24, as described below, filters the digital signal to create a filtered digital signal. The data synthesizer 26 synthesizes additional data points with greater resolution than the received analog signals. Together, the data synthesizer generates a higher resolution signal that the convolution filter 24 filters by analyzing the numerical value of the neighbors of the data point. The digital signal processor 12 outputs the digitized filtered data to the data storage 16 in the control unit 14.

The GUI engine 18 is a graphical user interface engine configured to communicate with the digital signal processor 12, the data storage 16 and a user interface 20. The GUI engine 18 receives parameters from the user interface 20 to set the filter resolution in the data synthesizer 26 and convolution filter 24. A user may define the kernel size of the convolution filter, the shape of the convolution filter, the weights given to the neighbors of the elements being filtered, the size and shape of the data synthesized and the order of filtering the data. The GUI engine 18 passes these parameters to the convolution filter 24 and the data synthesizer 26 so that the digital signal processor 12 may calculate the digital data stored in the data storage 16 according to the desire of a user.

The display 22 and the user interface 20 are configured to interact with the control unit 14 so that a user may input parameters through the user interface 20 and review the output of those chosen parameters through the display 22. The user interface 20 may be as basic as a terminal with keyboard and mouse entry, a touch-screen, or any other means for inputting data into a controller. The display 22 may generally be a video screen to receive the video source from the data storage that represents the digital information recorded by the digital signal processor 12.

Figure 2:
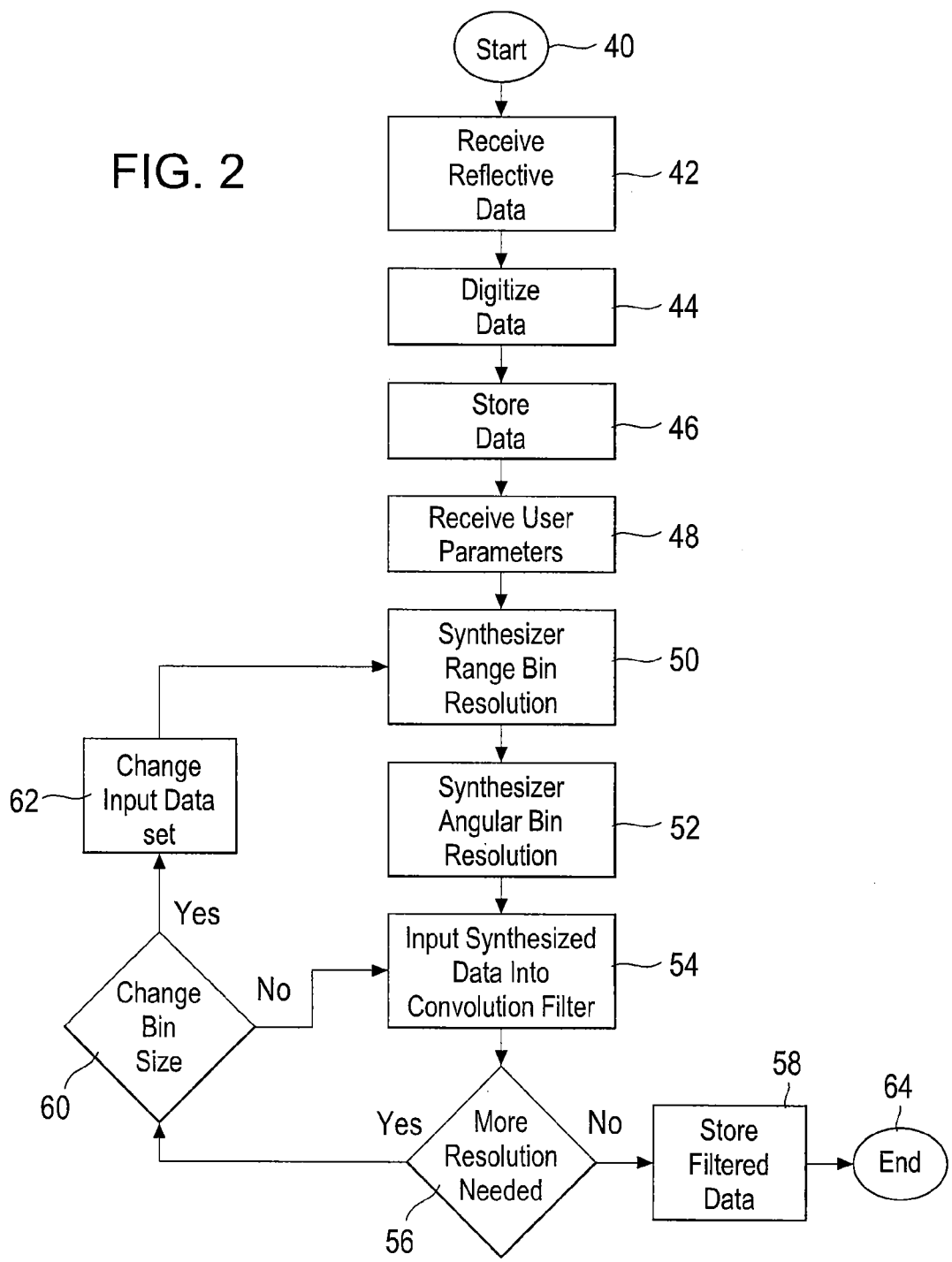
FIG. 2 is a flow chart showing the steps of an embodiment of the invention.

Turning now to FIG. 2, FIG. 2 is a flow chart showing the steps of an embodiment of the invention. The method begins at step 40. Reflectivity data is received in step 42, digitized in step 44, and temporarily stored in step 46. The method receives user parameters in step 48. In step 50, range bin resolution is synthesized according to the parameters received in step 48. The angular bin resolution is synthesized in step 52. The synthesized data is then input 54 into the convolution filter. Once the synthesized data is filtered, the method determines whether more resolution is needed in step 56. If no further resolution is needed, then the filtered data is stored in step 58. If more resolution is needed, then the method determines whether the bin size should be changed in step 60. If the bin size is not changed then the synthesized data is passed through the convolution filter in step 54 again. If the bin size is set to change, then the input data set parameter is reset in step 62 and the process returns at step 50 to synthesize the additional data set and then filter the signal again. When the resolution is adequate in step 56, and the data is stored in step 58, then the method ends in step 64.

In step 42, reflectivity data is received from the antenna. The data is an analog signal representing the reflected data from the transmitted signals and includes both an amplitude and a phase component. The reflectivity data contains information that can determine the size, type and direction of hydrometeors by examining the phase, frequency, and amplitude of the received transmitted signal. In step 44, the data is digitized from the analog signal of step 42. By examining the reflectivity data from step 42 and the transmitted signal, the in-phase and quadrature signals may be generated. The in-phase and quadrature signals determine the size, type and direction of the hydrometeors by examining the phase shift, frequency shift and change in amplitude of the received signal compared to the transmitted signal. The data is generally displayed as an exponential number which is stored 46 in temporary memory.

Step 48 receives user parameters. A user may identify the size of the convolution filter, the weighting of the convolution filter, the shape of the convolution filter and any order of filtering. The user may also define the size of the data synthesis for any single data point, or cell. As the user becomes more comfortable with the system and becomes more familiar with the surrounding geography of the radar system, the user will become more proficient at setting these variables for best radar resolution. For example, if the majority of geographic locations of interest to the user are close to the radar location, then the user may wish to synthesize data only in the range direction and not in the angular direction. If, however, the location of interest will generally be farther from the radar location the user may wish to synthesize data in both the angular direction and the range direction, or may wish to synthesize more data in the angular direction relative to the range direction. A user may also wish to define the weight, size and shape of the convolution filter based upon the location and the amount of synthesis occurring in the method.

In step 50, the range bin resolution is synthesized. Synthesis first requires changing the exponential number to a floating point number. The synthesis also adds resolution to the data by resizing each data point into multiple data points. In step 50, the number of data points in the direction of range is determined. In step 52, the number of data points in the angular direction is determined. The results of steps 50 and 52 is a M×N matrix of M rows extending in the angular direction and N columns extending in the range direction. Each of the cells in the M×N matrix is populated with value from the original 1×1 cell. For each data point in the stored data, an M×N matrix is generated to store each data point M×N times.

In step 54, the synthesized data from steps 50 and 52 are input into a convolution filter. The convolution filter performs the mathematical filtering operation on each cell within each M×N matrix for each data point from the stored data. For each calculation of the filter, a new value for each element in each M×N matrix is calculated, but until all cells in all M×N matrices for all data points is calculated, the neighbor data for the calculation is based upon the original data points. Because the data represents data recovered from 360° around the radar antenna, the beginning of the file and the end of the file represent adjacent angular orientations of the local geographic area. Thus, there is no edge condition in the angular direction. In the range direction, an edge condition is generated at the outer most data points and a convolution filter must account for the edge in order to correctly calculate the filtered values at the edge.

In step 56, the method determines whether more resolution is needed. If no more resolution is needed, then the M×N matrices for each data point are stored in step 58. If more resolution is needed, then the method requests information from a user. If the user wishes to change the bin size in step 60, then the user inputs a data set representing the bin size for the range and angular resolution. The method then returns those range sizes to step 50. By inputting a new matrix size, M'×N', the convolution filter in step 54 will calculate M'×N' data points for each stored data point from step 46 for all data points in the angular direction and range direction. If the user does not wish to change the bin resolution size of the matrices, then the resolution may be increased by filtering the data from the already filtered data set. Thus the data input into step 54 is the data having already been filtered one time (i.e. a second order filter). If the output from step 54 again requires more resolution, then either more bins may be added or higher order filtering may be used. Alternatively, a combination of higher order filtering and increased bin size may be used. Examples of combinations of higher order filtering and increased bin size are shown in FIGS. 4-7.

Figure 3:
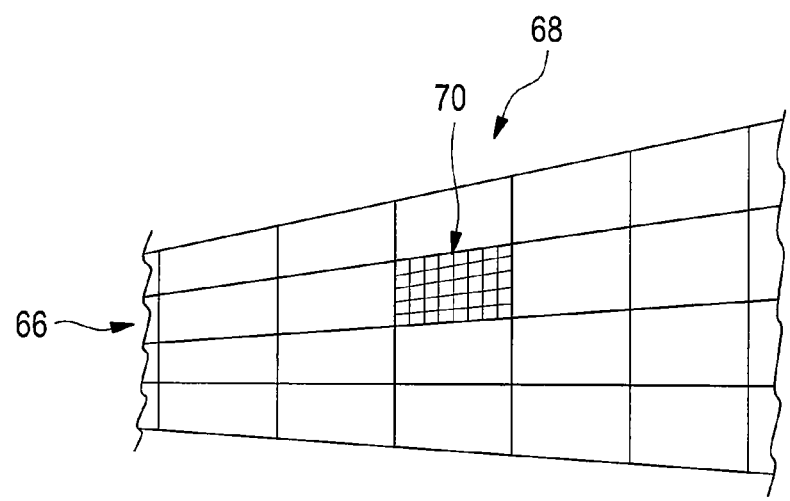
FIG. 3 is an example of geographically located radar data.

Turning now to drawing FIG. 3, FIG. 3 is an example of geographically located radar data. The example includes row 66 and column 68 representing the angular direction and range direction, respectively. A matrix 70 is the synthesized data matrix for a single data point represented by one cell in one row 66 and one column 68. The matrix 70 is an M×N matrix, in this example, a 5×8 matrix. The matrix 70 thus provides 5 times the resolution in the angular direction and 8 times the resolution in the range direction. Each element in the 5×8 matrix 70 is populated with the original data value from the original cell. Each cell in each row 66 and column 68 would similarly be populated by a matrix 70 such that each cell would include 40 elements, each element having the initial value of the original cell.

In this example, the radar location is to the left of the figure at a position between the second and third rows of the figure. As the range from the radar increases, the height of the rows 66 increases. The width of the columns 68 remains constant because the width is determined by the pulse width of the signal sent from the antenna. Because of this configuration, the cells closest to the radar represent the smallest area while the cells farthest from the radar represent the greatest area. In an alternate embodiment, the data synthesizer may vary the number of rows in the M×N matrix according to distance from the radar. In such an embodiment, the cells nearest the radar would have fewer rows while the cells farther from the radar would have more rows. In such an embodiment, each individual element in the matrix 70 may be sized such that any element in any matrix 70 would represent the same geographic size. Such an embodiment may present a more uniform display.

Figure 4A:
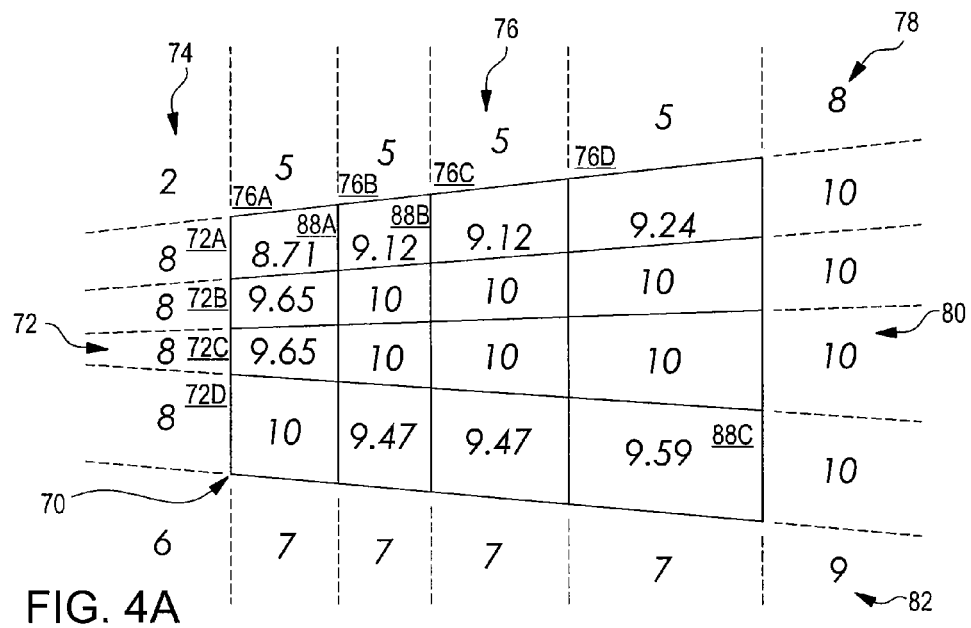
FIGS. 4A and 4B are examples of the steps of FIG. 2 in an embodiment of the present invention.
Figure 4B:
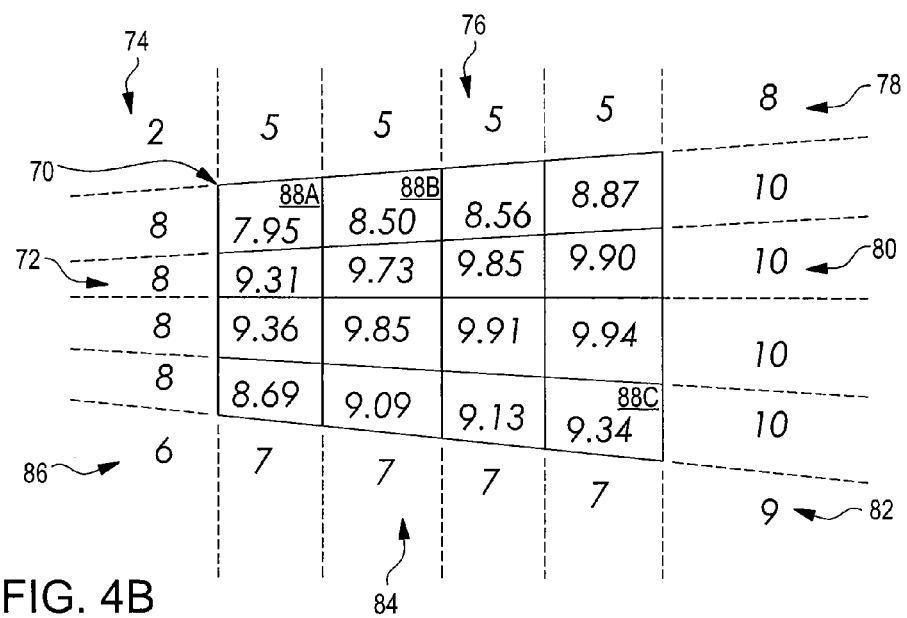

Turning now to drawing FIGS. 4A and 4B, FIGS. 4A and 4B are examples of the steps of FIG. 2 in an embodiment of the present invention. FIG. 4A shows a first order filter of a cell. The matrix 70 includes an M×N matrix having four rows and four columns, a square matrix. The matrix 70 neighbors a left neighbor 72, an upper left neighbor 74, and upper neighbor 76, an upper right neighbor 78, a right neighbor 80, a lower right neighbor 82, a lower neighbor 84, and a lower left neighbor 86. The original values for each of the neighbors is as follows:

TABLE 1

| Cell | Value |
|---|---|
| Center | 10 |
| Left | 8 |
| Upper Left | 2 |
| Upper | 5 |
| Upper Right | 8 |
| Right | 10 |
| Lower Right | 9 |
| Lower | 7 |
| Lower Left | 6 |

The center cell, with a value of 10, populates each of the cells in the matrix 70. For example, cells 88A, 88B and 88C all initially start with a value of 10. In this example, the convolution filter is center weighted, meaning the value for the matrix entry that the filter is calculating is weighted equivalently to all surrounding cells. When the center cell is split into a 4×4 matrix, the neighbor cells 72, 76, 80 and 84 (the left, upper, right and lower cells, respectively) are also split into a 4×4 matrix. The corner neighbors 74, 78, 82 and 86 which represent the upper left, upper right, lower right and lower left neighbors have only a single cell which will neighbor the matrix 70. The calculation of any individual element in the matrix 70, such as 88A, 88B or 88C is calculated using each of the individual elements immediate neighbors. For example, element 88A is calculated using the value of the elements 72A, 74, 76A, 76B, 88B, 72B and the elements represented at the intersection of column 76A and row 72B and column 76B and row 72B. The initial values for elements 88B, element at the intersection of column 76A and row 72B and element at the intersection of column 76B and row 72B all have an initial value of 10 because those are synthesized data points created in the original center cell having a value of 10. The value of element 88A is calculated by adding the total value of each of the neighbors and 9 times the value of the element upon which the filter is centered. Thus, for element 88A, the calculation is 2+5+5+10+10+10+8+8+9×10. This value is then averaged by dividing the summed result by 17. The result for each element is shown in FIG. 4A in the matrix 70.

FIG. 4B shows a second order filter based upon the results of the first order filter of FIG. 4A. In FIG. 4B, the neighbor elements 72-86 have maintained the same initial value. However, the value of the elements in matrix 70 are from the filter calculations of FIG. 4A. For example, the element 88B is calculated using the value of the upper neighbor, the values in column 76C as intersects with rows 72A and 72B. The column 76B intersects with column 72B and the column 76A elements intersected at rows 72A and 72B. Thus, the second order filter value for element 88b in FIG. 4B is calculated as 5+5+5+9.12+10+10+9.65+8.71, and then divided by the factor 17. By filtering the data a second time, the interior elements of the matrix 70 are filtered having some components contributed to the value from the neighbor cells 72-86. However, the interior elements of FIG. 4B are closer to the original value of the center cell (10) which is both expected and desired. The edge elements of matrix 70 converge in value to the neighbor cells 72-86, which provides a graded slope from the values of the neighbor cells 72-86 to the center cell matrix 70.

Figure 5A:
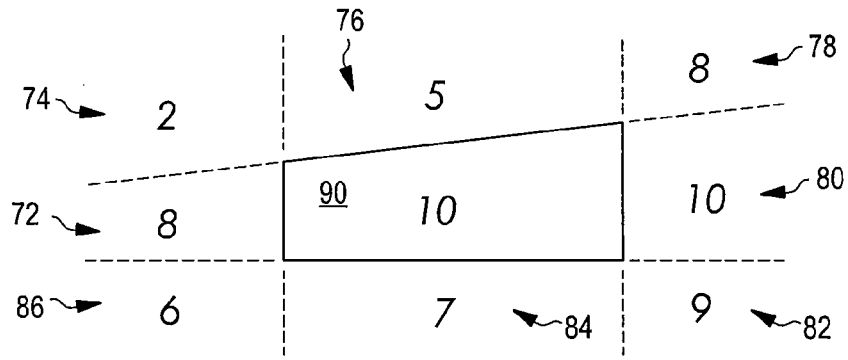
FIGS. 5A-5C are examples of another set of steps according to an aspect of the invention.
Figure 5B:
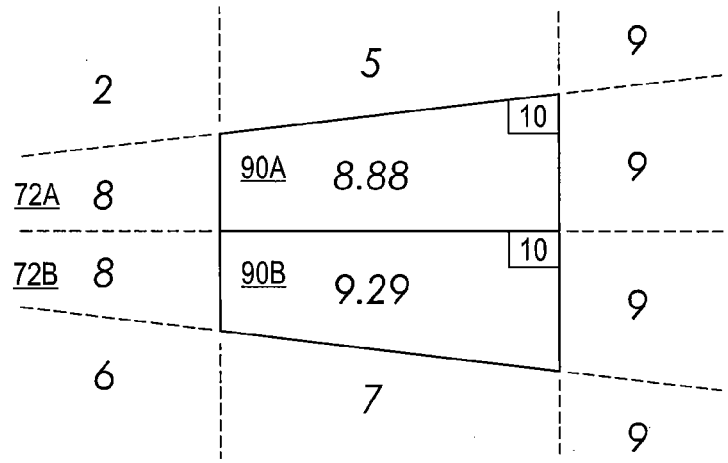
Figure 5C:
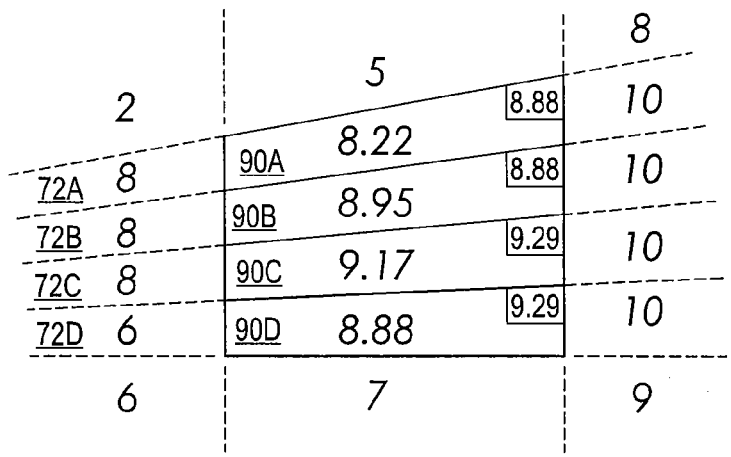

Turning now to drawing FIGS. 5A-5C, FIGS. 5A-5C are examples of another set of steps according to an aspect of the invention. FIG. 5A includes a center cell 90 surrounded by the neighboring cells 72-86. The values for the center cell 90 and the neighboring cells 72-86 are the same as in the example of FIG. 4. The example of FIGS. 5A-5C shows data synthesis in a single direction, namely, the angular direction.

In FIG. 5B, the center cell 90 is split into two elements 90A and 90B. The left neighbor 72 is also split into two elements 72A and 72B and the right neighbor likewise is split into two elements. The initial value of cells 90A and 90B, similar to the example of FIG. 4, is 10. To calculate the value of element 90A, the neighbors are summed along with the initial value of the cell weighted by a factor of 9. Thus, the value of element 90A is (2+5+8+10+10+10+8+8+9×10)/17. The value for element 90B is(8+10+10+10+9+7+6+8+9×10)/17. These values are 8.88 and 9.29, respectively. As would be expected, element 90A is smaller given the neighbors to element 90A are relatively smaller (e.g., left upper neighbor value 2 and upper neighbor value 5). While element 90B has a higher value due to the relatively high values of its neighbors (e.g., lower neighbor value 7 and lower right neighbor value 9).

Turning now to FIG. 5C, the center cell 90 is both synthesized by a factor of 2 and filtered a second time. Center cell 90 is synthesized to include elements 90A, 90B, 90C and 90D. In order to calculate these synthesized elements, the left and right neighbors 72 and 80 are also split into four elements as shown by elements 72A, 72B, 72C and 72D. The initial values for elements 90A and 90B are 8.88, which was the initial value for the element 90A of FIG. 5B. The initial value for elements 90C and 90D is 9.29, which was the initial value for the bottom half of the center cell in FIG. 5B (element 90B). The value of the cells 90A-90D are:

TABLE 2

| Element | Value |
|---------|-------|
| 90A | 8.22 |
| 90B | 8.95 |
| 90C | 9.17 |
| 90D | 8.88 |

The values of Table 2 for the elements 90A-90D also show an expected convergence in value. The two interior elements 90B and 90C are closest to the original value of the cell while the outer elements 90A and 90D track toward the values of the neighbor elements while heavily weighed towards the initial value of the cell. In FIG. 5C, the angular resolution has increased four times the original resolution of FIG. 5A and shows a gradient between the neighbors and the center cell 90. The gradient allows a user to view the cell with additional information that may help the user to define the type, shape, and direction of the atmospheric event.

Figure 6A:
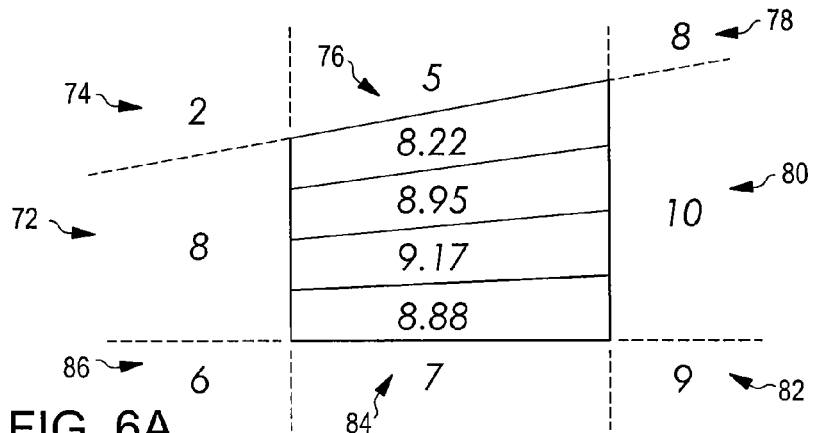
FIGS. 6A-6C are examples of further processing of the example of FIGS. 5A-5C.
Figure 6B:
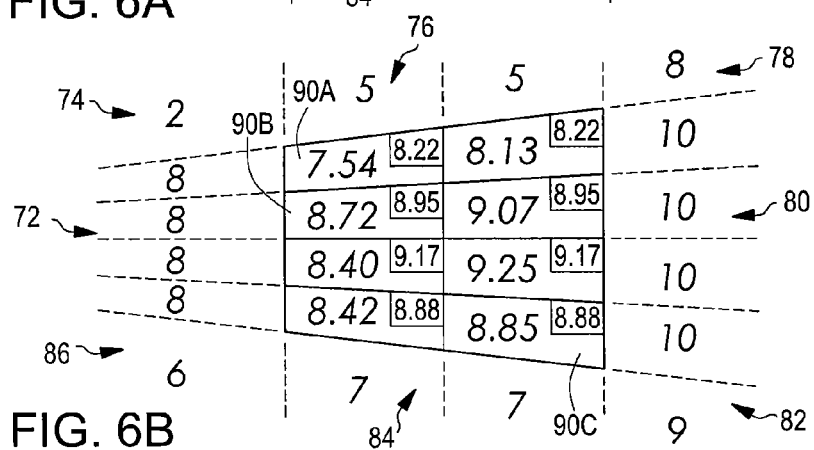
Figure 6C:
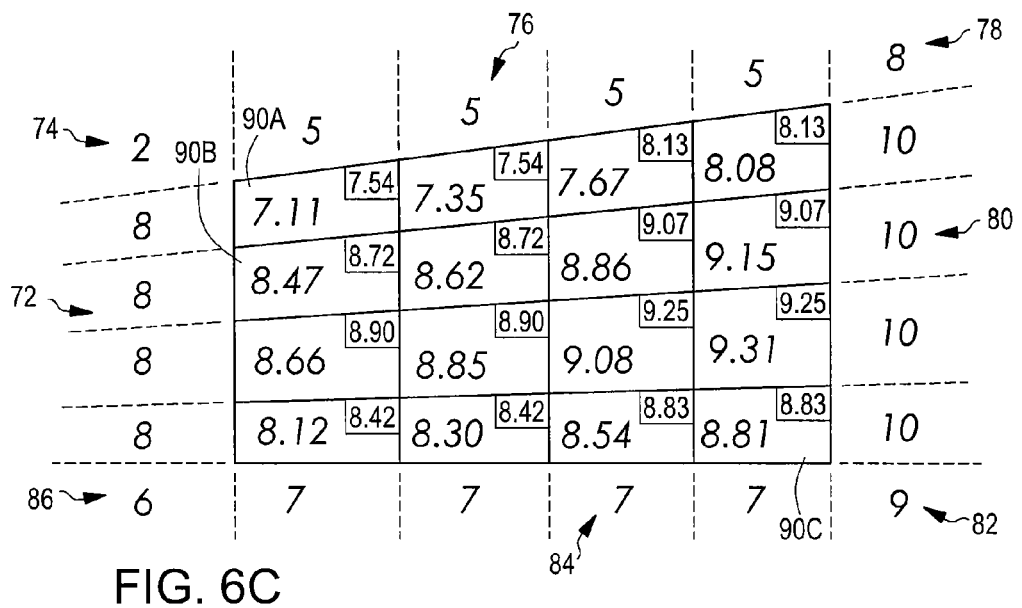

Turning now to drawing FIGS. 6A-6C, FIGS. 6A-6C are examples of further processing of the example of FIGS. 5A-5C. FIGS. 6A-6C show an example of adding range resolution to the angularly resolved example of FIG. 5C. FIG. 6A is similar to the FIG. 5C. FIGS. 6B and 6C each double the range resolution by synthesizing data points in the range direction. In FIG. 6B, the upper and lower neighbors 76 and 84 are split into two columns 76A and 76B. Each element in the center cell along the same angular orientation is assigned the value from the element in the same angular orientation from FIG. 6A. Thus, element 90A in FIG. 6B is assigned an initial value of 8.22. Similarly, the right neighbor of element 90A is also assigned a value of 8.22. The lower right neighbor of element 90A (also the right neighbor of element 90B) is assigned a value of 8.95. Each element in the center cell is calculated similarly using the convolution filter as previously discussed.

In FIG. 6C, the range resolution is amplified by a factor of 2 with respect to FIG. 6B. Similar to the operation of FIG. 6B, each element in the center cell is initially given a value based upon its angular position and range position with respect to FIG. 6B. The calculations for any element in FIG. 6C, for example 90A, 90B or 90C, is based upon the results of the calculations performed in FIG. 6B. Thus, the resolution of the center cell in FIG. 6C is both increased by a factor of 2 with respect to FIG. 6B and filtered for a second time from the original angularly synthesized data set of FIG. 6A. The resolution of FIG. 6C, as compared to the single data point in the center cell of FIG. 5A, has been resolved by a factor of 16.

Figure 7A:
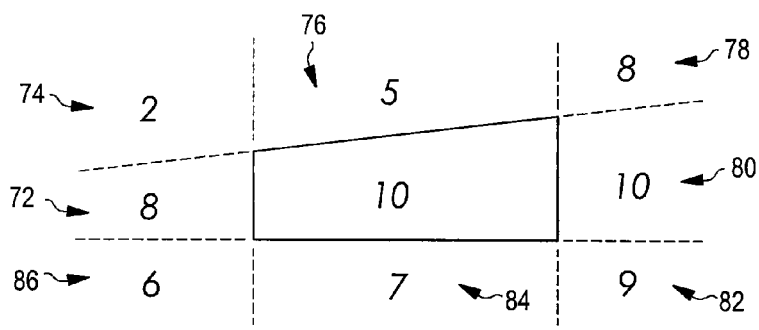
FIGS. 7A-7C are examples of the steps in accordance with another embodiment of the present invention.
Figure 7B:
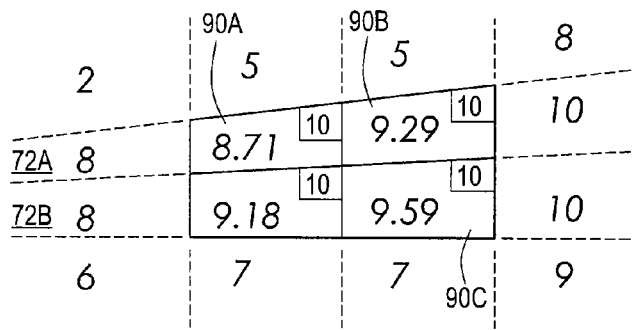
Figure 7C:
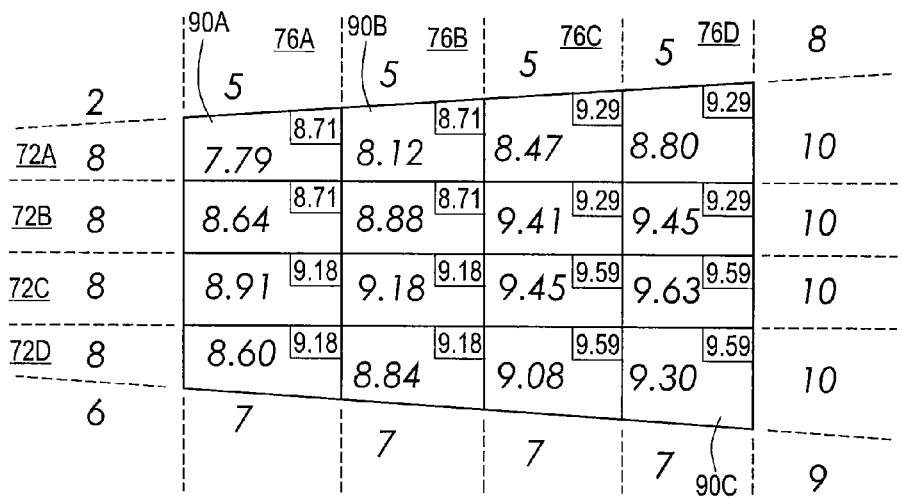

Turning now to drawing FIGS. 7A-7C, FIGS. 7A-7C are examples of the steps in accordance with another embodiment of the present invention. FIG. 7A is the same, original example radar data for each of the previous examples. In FIG. 7B, the center cell is synthesized in both the angular direction and in the range direction by a factor of 2. The calculations for the 2×2 matrix of the center cell are calculated based upon neighbors 72-86. The resulting filter data is shown in FIG. 7B. In FIG. 7C, the synthesized and filtered matrix of the center cell of FIG. 7B is again synthesized by a factor of 2 in each of the angular and range directions. Each element in the 4×4 center cell matrix is filtered according to the same function as previously described and the results are shown in FIG. 7C. The 4×4 matrix results for the center cell are stored and are used for display of the data.

While the data points of the examples of FIGS. 4-7 have been simple numbers ranging from 2 to 10, actual data points received from the radar are generally not as simple. Instead, as previously described, the data points received from the radar antenna are in exponential form. Prior to synthesizing and filtering the data, however, the exponential data points should be changed to floating point numbers so that the filtering does not skew the amplitudes of the synthesized data points because of the exponential function. After filtering is completed, the resultant synthesized and filtered data should be returned to exponential form prior to display. In addition, the examples have shown a simplified form of the convolution filter which did not change the neighbors values 72-86 in order to calculate the values of the elements in the center cell matrix. However, in application, because all data points would be filtered, each order filter would include values for the neighboring elements that had changed from the original value.

In alternate embodiments, the filter may take a shape other than a square shape including only the nearest neighbors on each side. For example, a circular filter may be applied in which all neighboring elements within a certain circumference of the center cell may be used to calculate the value of the center cell. In other embodiments, the filter may include not only the neighbors but the neighbors of the neighbors and so on with weights for the neighbor cells assigned according to the distance from the center cell. Such weights may be linearly related according to distance from the center element, or may be related in some other manner according to need or desire of a user. Furthermore, because the data points nearest to the radar occupy the least space as previously discussed, it is possible to vary both the synthesis process and the filtering process according to distance from the radar and according to the user defined parameters.

While the invention has been shown in embodiments described herein, it will be obvious to those skilled in the art that the invention is not so limited but may be modified with various changes that are still within the spirit of the invention.

Having set forth the nature of the present invention, what is claimed is:

1. A system for synthesizing data received from a weather radar system, comprising:
   a. a digital signal processor configured to digitize reflectivity data from a radar antenna;
   b. said digital signal processor including a data synthesizer configured to generate an M×N matrix for a digitized reflectivity data point and further configured to populate each element in said M×N matrix with the value of said digitized reflectivity data point;
   c. said digital signal processor including a convolution filter configured to calculate a filtered value for each said element in said M×N matrix; and,
   d. data storage configured to store said M×N matrix for display.

2. The system of claim 1, wherein said data synthesizer is further configured to generate an M×N matrix for each digitized reflectivity point.

3. The system of claim 2, wherein said M×N matrix is a square matrix.

4. The system of claim 1, further comprising a user interface configured to receive parameters for said data synthesizer and said convolution filter.

5. The system of claim 4, wherein said parameters comprise the size of said M×N matrix.

6. The system of claim 5, wherein said user interface is configured to receive an update of said size of said M×N matrix, such that at least one of the values defining said size of said updated M×N matrix differs from said M×N matrix.

7. The system of claim 4, wherein said parameters comprise the shape of said convolution filter.

8. The system of claim 4, wherein said parameters comprise a weighting matrix for said convolution filter.

9. The system of claim 4, wherein said parameters comprise an order for said convolution filter.

10. The system of claim 1, further comprising an inverse logarithmic base 10 operator configured to invert exponentiated digitized reflectivity data into floating point data.

11. The system of claim 10, further comprising a logarithmic base 10 operator configured to exponentiate said filtered values for each said element in said M×N matrix.

12. The system of claim 11, further comprising a display configured to display an intensity map of said exponentiated filtered value for each said element in said M×N matrix.

13. A method of synthesizing data received from a weather radar system, comprising:
   a. digitizing reflectivity data from a radar antenna;
   b. generating an M×N matrix for a digitized reflectivity data point;
   c. populating each element in said M×N matrix with the value of said digitized reflectivity data point;
   d. filtering each said element in said M×N matrix; and
   e. storing said M×N matrix for display.

14. The method of claim 13, wherein said generating step and said populating step generates and populates an M×N matrix for each digitized reflectivity point.

15. The method of claim 14, wherein said M×N matrix is a square matrix.

16. The method of claim 13, further comprising the step of synthesizing said M×N matrix into a larger M×N matrix after said filtering step.

17. The method of claim 16, further comprising the step of filtering said M×N matrix.

18. The method of claim 13, further comprising the step of filtering again said M×N matrix after said filtering step.

19. The method of claim 13, wherein said filtering step uses a convolution filter to filter said M×N matrix.

20. The method of claim 13, further comprising the step of inverting exponential digitized reflectivity data into floating point data.

21. The method of claim 20, further comprising the step of exponentiating said filtered M×N matrix.

22. The method of claim 21, further comprising displaying an intensity map of said exponentiated and filtered M×N matrix.

23. A system for synthesizing data received from a weather radar system, comprising:
   a. means for digitizing reflectivity data from a radar antenna;
   b. means for generating an M×N matrix for a digitized reflectivity data point based upon said digitized reflectivity data;
   c. means for populating each element in said M×N matrix with the value of said digitized reflectivity data point;
   d. means for filtering each said element in said M×N matrix; and
   e. means for storing said M×N matrix for display.

24. The system of claim 23, wherein said means for generating is further configured to generate an M×N matrix for each digitized reflectivity point.

25. The system of claim 24, wherein said M×N matrix is a square matrix.

26. The system of claim 23, further comprising means for receiving parameters for said means for generating and said means for filtering.

27. The system of claim 26, wherein said parameters comprise the size of said M×N matrix.

28. The system of claim 27, wherein said means for receiving parameters is configured to receive an update of said size of said M×N matrix, such that at least one of the values defining said size of said updated M×N matrix differs from said M×N matrix.

29. The system of claim 26, wherein said parameters comprise the shape of a convolution filter.

30. The system of claim 26, wherein said parameters comprise a weighting matrix for said convolution filter.

31. The system of claim 26, wherein said parameters comprise an order for said convolution filter.

32. The system of claim 23, further comprising means for inverting exponential digitized reflectivity data into floating point data.

33. The system of claim 32, further comprising means for exponentiating said filtered values for each said element in said M×N matrix.

34. The system of claim 33, further comprising means for displaying an intensity map of said exponentiated filtered value for each said element in said M×N matrix.

* * * * *